(12) United States Patent
Heshmati et al.

(10) Patent No.: US 12,416,807 B2
(45) Date of Patent: Sep. 16, 2025

(54) RETINAL PROJECTION DISPLAY SYSTEM

(71) Applicant: TDK CORPORATION, Tokyo (JP)

(72) Inventors: Ardalan Heshmati, Saratoga, CA (US); Hideaki Fukuzawa, Kanagawa (JP)

(73) Assignee: TDK CORPORATION, Tokyo (JP)

( * ) Notice: Subject to any disclaimer, the term of this patent is extended or adjusted under 35 U.S.C. 154(b) by 521 days.

(21) Appl. No.: 17/820,876

(22) Filed: Aug. 18, 2022

(65) Prior Publication Data

US 2023/0054450 A1 Feb. 23, 2023

Related U.S. Application Data

(60) Provisional application No. 63/260,485, filed on Aug. 20, 2021.

(51) Int. Cl.
*G02B 27/01* (2006.01)
*G02B 26/10* (2006.01)
*G02B 27/00* (2006.01)

(52) U.S. Cl.
CPC ....... *G02B 27/0172* (2013.01); *G02B 26/101* (2013.01); *G02B 27/0179* (2013.01); *G02B 2027/0178* (2013.01); *G02B 2027/0181* (2013.01); *G02B 2027/0187* (2013.01)

(58) Field of Classification Search
CPC ........ G02B 27/0172; G02B 2027/0178; G02B 27/0179; G02B 2027/0123; G02B 27/0093
See application file for complete search history.

(56) References Cited

U.S. PATENT DOCUMENTS

| | | |
|---|---|---|
| 4,880,012 A | 11/1989 | Sato |
| 5,575,286 A | 11/1996 | Weng et al. |
| 5,684,243 A | 11/1997 | Gururaja et al. |
| 5,808,967 A | 9/1998 | Yu et al. |
| 5,867,302 A | 2/1999 | Fleming |
| 5,911,692 A | 6/1999 | Hussain et al. |
| 6,071,239 A | 6/2000 | Cribbs et al. |
| 6,104,673 A | 8/2000 | Cole et al. |
| 6,289,112 B1 | 9/2001 | Jain et al. |
| 6,292,576 B1 | 9/2001 | Brownlee |
| 6,350,652 B1 | 2/2002 | Libera et al. |
| 6,428,477 B1 | 8/2002 | Mason |
| 6,433,907 B1 | 8/2002 | Lippert et al. |

(Continued)

FOREIGN PATENT DOCUMENTS

| | | |
|---|---|---|
| CN | 1826631 A | 8/2006 |
| CN | 101192644 A | 6/2008 |

(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Ryan D Howard

(57) ABSTRACT

A retinal projection display system includes a light source for projecting an image, a scanning mirror having a field of view larger than the image, and a reflective surface on which the image is projected, wherein the reflective surface is larger than the image. The scanning mirror projects the image onto a viewable region of the reflective surface such that the image is projected into a retina of a user.

18 Claims, 10 Drawing Sheets

(56) References Cited

U.S. PATENT DOCUMENTS

| | | |
|---|---|---|
| 6,483,932 B1 | 11/2002 | Martinez et al. |
| 6,500,120 B1 | 12/2002 | Anthony |
| 6,676,602 B1 | 1/2004 | Barnes et al. |
| 6,736,779 B1 | 5/2004 | Sano et al. |
| 7,067,962 B2 | 6/2006 | Scott |
| 7,109,642 B2 | 9/2006 | Scott |
| 7,243,547 B2 | 7/2007 | Cobianu et al. |
| 7,257,241 B2 | 8/2007 | Lo |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,739,912 B2 | 6/2010 | Schneider et al. |
| 8,018,010 B2 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,582,705 B2 | 2/2017 | Du et al. |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,618,405 B2 | 4/2017 | Liu et al. |
| 9,665,763 B2 | 5/2017 | Du et al |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,933,319 B2 | 4/2018 | Li et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,006,824 B2 | 6/2018 | Tsai et al. |
| 10,275,638 B1 | 4/2019 | Yousefpor et al. |
| 10,315,222 B2 | 6/2019 | Salvia et al. |
| 10,322,929 B2 | 6/2019 | Soundara Pandian et al. |
| 10,325,915 B2 | 6/2019 | Salvia et al. |
| 10,387,704 B2 | 8/2019 | Dagan et al. |
| 10,445,547 B2 | 10/2019 | Tsai |
| 10,461,124 B2 | 10/2019 | Berger et al. |
| 10,478,858 B2 | 11/2019 | Lasiter et al. |
| 10,488,274 B2 | 11/2019 | Li et al. |
| 10,497,747 B2 | 12/2019 | Tsai et al. |
| 10,515,255 B2 | 12/2019 | Strohmann et al. |
| 10,539,539 B2 | 1/2020 | Garlepp et al. |
| 10,600,403 B2 | 3/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,726,231 B2 | 7/2020 | Tsai et al. |
| 10,755,067 B2 | 8/2020 | De Foras et al. |
| 11,107,858 B2 | 8/2021 | Berger et al. |
| 2001/0016686 A1 | 8/2001 | Okada et al. |
| 2002/0062086 A1 | 5/2002 | Miele et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2006/0052697 A1 | 3/2006 | Hossack et al. |
| 2006/0079777 A1 | 4/2006 | Karasawa |
| 2006/0210130 A1 | 9/2006 | Germond-Rouet et al. |
| 2006/0230605 A1 | 10/2006 | Schlote-Holubek et al. |
| 2006/0280346 A1 | 12/2006 | Machida |
| 2007/0046396 A1 | 3/2007 | Huang |
| 2007/0047785 A1 | 3/2007 | Jang et al. |
| 2007/0073135 A1 | 3/2007 | Lee et al. |
| 2007/0202252 A1 | 8/2007 | Sasaki |
| 2007/0215964 A1 | 9/2007 | Khuri-Yakub et al. |
| 2007/0223791 A1 | 9/2007 | Shinzaki |
| 2007/0230754 A1 | 10/2007 | Jain et al. |
| 2008/0125660 A1 | 5/2008 | Yao et al. |
| 2008/0146938 A1 | 6/2008 | Hazard et al. |
| 2008/0150032 A1 | 6/2008 | Tanaka |
| 2008/0194053 A1 | 8/2008 | Huang |
| 2008/0240523 A1 | 10/2008 | Benkley et al. |
| 2009/0005684 A1 | 1/2009 | Kristoffersen et al. |
| 2009/0163805 A1 | 6/2009 | Sunagawa et al. |
| 2009/0182237 A1 | 7/2009 | Angelsen et al. |
| 2009/0232367 A1 | 9/2009 | Shinzaki |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0063391 A1 | 3/2010 | Kanai et al. |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |
| 2012/0095335 A1 | 4/2012 | Sverdlik et al. |
| 2012/0095344 A1 | 4/2012 | Kristoffersen et al. |
| 2012/0095347 A1 | 4/2012 | Adam et al. |
| 2012/0147698 A1 | 6/2012 | Wong et al. |
| 2012/0179044 A1 | 7/2012 | Chiang et al. |
| 2012/0224041 A1 | 9/2012 | Monden |
| 2012/0232396 A1 | 9/2012 | Tanabe |
| 2012/0238876 A1 | 9/2012 | Tanabe et al. |
| 2012/0263355 A1 | 10/2012 | Monden |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127297 A1 | 5/2013 | Bautista et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294201 A1 | 11/2013 | Hajati |
| 2013/0294202 A1 | 11/2013 | Hajati |
| 2014/0003679 A1 | 1/2014 | Han et al. |

(56) References Cited

U.S. PATENT DOCUMENTS

| | | |
|---|---|---|
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0294262 A1 | 10/2014 | Schuckers et al. |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |
| 2015/0097468 A1 | 4/2015 | Hajati et al. |
| 2015/0105663 A1 | 4/2015 | Kiyose et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0324569 A1 | 11/2015 | Hong et al. |
| 2015/0345987 A1 | 12/2015 | Hajati |
| 2015/0357375 A1 | 12/2015 | Tsai et al. |
| 2015/0358740 A1 | 12/2015 | Tsai et al. |
| 2015/0362589 A1 | 12/2015 | Tsai |
| 2015/0371398 A1 | 12/2015 | Qiao et al. |
| 2016/0041047 A1 | 2/2016 | Liu et al. |
| 2016/0051225 A1 | 2/2016 | Kim et al. |
| 2016/0063294 A1 | 3/2016 | Du et al. |
| 2016/0063300 A1 | 3/2016 | Du et al. |
| 2016/0070967 A1 | 3/2016 | Du et al. |
| 2016/0070968 A1 | 3/2016 | Gu et al. |
| 2016/0086010 A1 | 3/2016 | Merrell et al. |
| 2016/0091378 A1 | 3/2016 | Tsai et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0117541 A1 | 4/2016 | Lu et al. |
| 2016/0180142 A1 | 6/2016 | Riddle et al. |
| 2016/0296975 A1 | 10/2016 | Lukacs et al. |
| 2016/0299014 A1 | 10/2016 | Li et al. |
| 2016/0326477 A1 | 11/2016 | Fernandez-Alcon et al. |
| 2016/0350573 A1 | 12/2016 | Kitchens et al. |
| 2016/0358003 A1 | 12/2016 | Shen et al. |
| 2017/0004346 A1 | 1/2017 | Kim et al. |
| 2017/0004352 A1 | 1/2017 | Jonsson et al. |
| 2017/0032485 A1 | 2/2017 | Vemury |
| 2017/0059380 A1 | 3/2017 | Li et al. |
| 2017/0075700 A1 | 3/2017 | Abudi et al. |
| 2017/0076132 A1 | 3/2017 | Sezan et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0188021 A1 | 6/2017 | Lo et al. |
| 2017/0194934 A1 | 7/2017 | Shelton et al. |
| 2017/0200054 A1 | 7/2017 | Du et al. |
| 2017/0219536 A1 | 8/2017 | Koch et al. |
| 2017/0231534 A1 | 8/2017 | Agassy et al. |
| 2017/0243049 A1 | 8/2017 | Dong |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0325081 A1 | 11/2017 | Chrisikos et al. |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330552 A1 | 11/2017 | Garlepp et al. |
| 2017/0330553 A1 | 11/2017 | Garlepp et al. |
| 2017/0344782 A1 | 11/2017 | Andersson |
| 2017/0357839 A1 | 12/2017 | Yazdandoost et al. |
| 2018/0025202 A1 | 1/2018 | Ryshtun et al. |
| 2018/0032788 A1 | 2/2018 | Krenzer et al. |
| 2018/0101711 A1 | 4/2018 | D'Souza et al. |
| 2018/0107852 A1 | 4/2018 | Fenrich et al. |
| 2018/0107854 A1 | 4/2018 | Tsai et al. |
| 2018/0129849 A1 | 5/2018 | Strohmann et al. |
| 2018/0129857 A1 | 5/2018 | Bonev |
| 2018/0150679 A1 | 5/2018 | Kim et al. |
| 2018/0178251 A1 | 6/2018 | Foncellino et al. |
| 2018/0206820 A1 | 7/2018 | Anand et al. |
| 2018/0217008 A1 | 8/2018 | Li et al. |
| 2018/0225495 A1 | 8/2018 | Jonsson et al. |
| 2018/0229267 A1 | 8/2018 | Ono et al. |
| 2018/0268232 A1 | 9/2018 | Kim et al. |
| 2018/0276443 A1 | 9/2018 | Strohmann et al. |
| 2018/0276672 A1 | 9/2018 | Breed et al. |
| 2018/0329560 A1 | 11/2018 | Kim et al. |
| 2018/0341799 A1 | 11/2018 | Schwartz et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2019/0005300 A1 | 1/2019 | Garlepp et al. |
| 2019/0012673 A1 | 1/2019 | Chakraborty et al. |
| 2019/0018123 A1 | 1/2019 | Narasimha-Iyer et al. |
| 2019/0043920 A1 | 2/2019 | Berger et al. |
| 2019/0046263 A1 | 2/2019 | Hayashida et al. |
| 2019/0057267 A1 | 2/2019 | Kitchens et al. |
| 2019/0073507 A1 | 3/2019 | D'Souza et al. |
| 2019/0087632 A1 | 3/2019 | Raguin et al. |
| 2019/0095015 A1 | 3/2019 | Han et al. |
| 2019/0102046 A1 | 4/2019 | Miranto et al. |
| 2019/0130083 A1 | 5/2019 | Agassy et al. |
| 2019/0171858 A1 | 6/2019 | Ataya et al. |
| 2019/0175035 A1 | 6/2019 | Van Der Horst et al. |
| 2019/0188441 A1 | 6/2019 | Hall et al. |
| 2019/0188442 A1 | 6/2019 | Flament et al. |
| 2019/0247887 A1 | 8/2019 | Salvia et al. |
| 2019/0311177 A1 | 10/2019 | Joo et al. |
| 2019/0325185 A1 | 10/2019 | Tang |
| 2019/0340455 A1 | 11/2019 | Jung et al. |
| 2019/0370518 A1 | 12/2019 | Maor et al. |
| 2020/0030850 A1 | 1/2020 | Apte et al. |
| 2020/0050816 A1 | 2/2020 | Tsai |
| 2020/0050817 A1 | 2/2020 | Salvia et al. |
| 2020/0050820 A1 | 2/2020 | Iatsun et al. |
| 2020/0050828 A1 | 2/2020 | Li et al. |
| 2020/0074135 A1 | 3/2020 | Garlepp et al. |
| 2020/0111834 A1 | 4/2020 | Tsai et al. |
| 2020/0125710 A1 | 4/2020 | Andersson et al. |
| 2020/0147644 A1 | 5/2020 | Chang |
| 2020/0150428 A1 | 5/2020 | Greenberg |
| 2020/0158694 A1 | 5/2020 | Garlepp et al. |
| 2020/0175143 A1 | 6/2020 | Lee et al. |
| 2020/0194495 A1 | 6/2020 | Berger et al. |
| 2020/0210666 A1 | 7/2020 | Flament |
| 2020/0250393 A1 | 8/2020 | Tsai et al. |
| 2020/0285882 A1 | 9/2020 | Skovgaard Christensen et al. |
| 2020/0302140 A1 | 9/2020 | Lu et al. |
| 2020/0342203 A1 | 10/2020 | Lin et al. |
| 2020/0355824 A1 | 11/2020 | Apte et al. |
| 2020/0400800 A1 | 12/2020 | Ng et al. |

(56) References Cited

U.S. PATENT DOCUMENTS

| | | | |
|---|---|---|---|
| 2020/0410070 | A1 | 12/2020 | Strohmann |
| 2020/0410193 | A1 | 12/2020 | Wu |
| 2021/0165213 | A1* | 6/2021 | Balachandreswaran ................... G02B 27/0172 |

FOREIGN PATENT DOCUMENTS

| | | | |
|---|---|---|---|
| CN | 102159334 A | 8/2011 | |
| CN | 105264542 A | 1/2016 | |
| CN | 105378756 A | 3/2016 | |
| CN | 106458575 B | 7/2018 | |
| CN | 109196671 A | 1/2019 | |
| CN | 109255323 A | 1/2019 | |
| EP | 1214909 A1 | 6/2002 | |
| EP | 2884301 A1 | 6/2015 | |
| EP | 3086261 A2 | 10/2016 | |
| EP | 1534140 B1 | 1/2019 | |
| EP | 3292508 B1 | 12/2020 | |
| EP | 3757884 A1 | 12/2020 | |
| JP | 2011040467 A | 2/2011 | |
| TW | 201531701 A | 8/2015 | |
| WO | 2009096576 A2 | 8/2009 | |
| WO | 2009137106 A2 | 11/2009 | |
| WO | 2014035564 A1 | 3/2014 | |
| WO | 2015009635 A1 | 1/2015 | |
| WO | 2015112453 A1 | 7/2015 | |
| WO | 2015120132 A1 | 8/2015 | |
| WO | 2015131083 A1 | 9/2015 | |
| WO | 2015134816 A1 | 9/2015 | |
| WO | 2015183945 A1 | 12/2015 | |
| WO | 2016007250 A1 | 1/2016 | |
| WO | 2016011172 A1 | 1/2016 | |
| WO | 2016022439 A1 | 2/2016 | |
| WO | 2016040333 A2 | 3/2016 | |
| WO | 2016053587 A1 | 4/2016 | |
| WO | 2016061406 A1 | 4/2016 | |
| WO | 2016061410 A1 | 4/2016 | |
| WO | 2017003848 A1 | 1/2017 | |
| WO | 2017053877 A2 | 3/2017 | |
| WO | 2017192890 A1 | 11/2017 | |
| WO | 2017192895 A1 | 11/2017 | |
| WO | 2017192899 A1 | 11/2017 | |
| WO | 2017196678 A1 | 11/2017 | |
| WO | 2017196681 A1 | 11/2017 | |
| WO | 2017196682 A1 | 11/2017 | |
| WO | 2017192903 A3 | 12/2017 | |
| WO | 2018148332 A1 | 8/2018 | |
| WO | 2019005487 A1 | 1/2019 | |
| WO | 2019164721 A1 | 8/2019 | |
| WO | 2020081182 A1 | 4/2020 | |

OTHER PUBLICATIONS

ISA/EP, International Search Report and Written Opinion for International Application # PCT/US2018/063431, pp. 1-15, mailed Feb. 5, 2019.

ISA/EP, International Search Report and Written Opinion for International Application No. PCT/US2017/031120, 12 pages, Aug. 29, 2017.

ISA/EP, International Search Report and Written Opinion for International Application No. PCT/US2017/031127, 13 pages, Sep. 1, 2017.

ISA/EP, International Search Report and Written Opinion for International Application No. PCT/US2017/031134, 12 pages, Aug. 30, 2017.

ISA/EP, International Search Report and Written Opinion for International Application No. PCT/US2017/031140, 18 pages, Nov. 2, 2017.

ISA/EP, International Search Report and Written Opinion for International Application No. PCT/US2017/031421 13 pages, Jun. 21, 2017.

ISA/EP, International Search Report and Written Opinion for International Application No. PCT/US2017/031426 13 pages, Jun. 22, 2017.

ISA/EP, International Search Report and Written Opinion for International Application No. PCT/US2017/031431, 14 pages, Aug. 1, 2017.

ISA/EP, International Search Report and Written Opinion for International Application No. PCT/US2017/031434, 13 pages, Jun. 26, 2017.

ISA/EP, International Search Report and Written Opinion for International Application No. PCT/US2017/031439, 10 pages, Jun. 20, 2017.

ISA/EP, International Search Report and Written Opinion for International Application No. PCT/US2017/031824, 18 pages, Sep. 22, 2017.

ISA/EP, International Search Report and Written Opinion for International Application No. PCT/US2017/031827, 16 pages, Aug. 1, 2017.

ISA/EP, International Search Report and Written Opinion for International Application No. PCT/US2017/031831, 12 pages, Jul. 21, 2017.

ISA/EP, International Search Report for International Application No. PCT/US2017/031826, 16 pages, Feb. 27, 2018.

ISA/EP, Partial International Search Report for International Application No. PCT/US2017/031140, 13 pages, Aug. 29, 2017.

ISA/EP, Partial International Search Report for International Application No. PCT/US2017/031823, 12 pages, Nov. 30, 2017.

"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.

"ZTE V7 MAX. 5,5" smartphone on MediaTeck Helio P10 cpu; Published on Apr. 20, 2016; https://www.youtube.com/watch?v=ncNCbpkGQZU (Year: 2016).

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12. Retrieved from Internet: http:/scitation.aip.org/content/aip/journal/adva/5/12/10.1063/1.4939217, 2015, 127231.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Rozen, et al., "Air-Coupled Aluminum Nitride Piezoelectric Micromachined Ultrasonic Transducers at 0.3 MHZ to 0.9 MHZ", 2015 28th IEEE International Conference on Micro Electro Mechanical Systems (MEMS), IEEE, Jan. 18, 2015, 921-924.

Savoia, et al., "Design and Fabrication of a cMUT Probe for Ultrasound Imaging of Fingerprints", 2010 IEEE International Ultrasonics Symposium Proceedings, Oct. 2010, 1877-1880.

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Tang, et al., "11.2 3D Ultrasonic Fingerprint Sensor-on-a-Chip", 2016 IEEE International Solid-State Circuits Conference, IEEE, Jan. 31, 2016, 202-203.

Thakar, et al., "Multi-resonator approach to eliminating the temperature dependence of silicon-based timing references", Hilton

(56) References Cited

OTHER PUBLICATIONS

Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.
Sugawara, et al., "Every aspect of advanced retinal imaging laser eyewear: principle, free focus, resolution, laser safety, and medical welfare applications", Proceedings of SPIE; [Proceedings of SPIE ISSN 0277-786X vol. 10524], SPIE, US, vol. 10545, Feb. 22, 2018 (Feb. 22, 2018), pp. 1054500-1054500.
ISA/EP, Partial International Search Report for International Application No. PCT/US2019/034032, 8 pages, Sep. 12, 2019, 8.
EP Office Action, for Application 17724184.1, mailed Oct. 12, 2021, 6 pages.
EP Office Action, for Application 17725017.2 mailed Feb. 25, 2022, 7 pages.
EP Office Action, mailed Oct. 9, 2021, 6 pages.
European Patent Office, Office Action,App 17725018, pp. 5, Oct. 25, 2021.
European Patent Office, Office Action, App 17725020.6, pp. 4, Oct. 25, 2021.
ISA/EP, International Search Report and Written Opinion for International Application # PCT/US2019/015020, pp. 1-23, mailed Jul. 1, 2019.
ISA/EP, International Search Report and Written Opinion for International Application # PCT/US2019/023440, pp. 1-10, mailed Jun. 4, 2019.
ISA/EP, International Search Report and Written Opinion for International Application No. PCT/US2018/037364, 10 pages, Sep. 3, 2018.
ISA/EP, International Search Report and Written Opinion for International Application No. PCT/US2019061516, 14 pages, Mar. 12, 2020.
ISA/EP, International Search Report and Written Opinion for International Application No. PCT/US2020/033854, 16 pages, Nov. 3, 2020.
ISA/EP, International Search Report and Written Opinion for International Application No. PCT/US2020/039208, 10 pages, Oct. 9, 2020.
ISA/EP, International Search Report and Written Opinion for International Application No. PCT/US2020/039452, 11 pages, Sep. 9, 2020.
ISA/EP, International Search Report and Written Opinion for International Application No. PCT/US2020/042427, 18 pages, Dec. 14, 2020.
ISA/EP, International Search Report and Written Opinion for International Application No. PCT/US2020/042428, 9 pages, Oct. 26, 2020.
ISA/EP, International Search Report and Written Opinion for International Application No. PCT/US2021/021412, 12 pages, Jun. 9, 2021.
ISA/EP, International Search Report and Written Opinion for International Application No. PCT/US2021/021561, 9 pages, Jun. 28, 2021.
ISA/EP, Partial Search Report and Provisional Opinion for International Application No. PCT/US2020/042427, 13 pages, Oct. 26, 2020.
ISA/EP, Partial Search Report for International Application No. PCT/US2020/033854, 10 pages, Sep. 8, 2020.
"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf—[retrieved on Jan. 24, 2019], Aug. 9, 2017, 1-8.
Office Action for CN App No. 201780029016.7 mailed Mar. 24, 2020, 7 pages.
Office Action for CN App No. 201780029016.7 mailed Sep. 25, 2020, 7 pages.
Office Action for TW App No. 106113266 mailed Jun. 22, 2020, 23 pages.
"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.
Taiwan Application No. 106114623, 1st Office Action, Dated Aug. 5, 2021, pp. 1-8.
"TMS320C5515 Fingerprint Development Kit (FDK) Hardware Guide", Texas Instruments, Literature No. SPRUFX3, XP055547651, Apr. 2010, 1-26.
Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.
Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.
Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.
Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.
Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.
Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.
Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.
Tang, et al., "Pulse-echo ultrasonic fingerprint sensor on a chip", 2015 Transducers, 2015 18th International Conference on Solid-State Sensors, Actuators and Microsystems, Apr. 1, 2015, 674-677.
Zhou, et al., "Partial Fingerprint Reconstruction with Improved Smooth Extension", Network and System Security, Springer Berlin Heidelberg, Jun. 3, 2013, 756-762.

* cited by examiner

RETINAL PROJECTION DISPLAY SYSTEM

RELATED APPLICATION

This application claims priority to and the benefit of U.S. Provisional Patent Application 63/260,485, filed on Aug. 20, 2021, entitled "ADAPTIVE EYE-BOX IN AR SMART GLASSES," by Heshmati, et al., and assigned to the assignee of the present application, which is incorporated herein by reference in its entirety.

BACKGROUND

Retinal projection displays (RPDs), also referred to as virtual retinal displays (VRD), are used to project images through the pupil of an eye directly onto the retina. The image rendering is performed fast enough such that the human eye perceives a continuous video stream of images. As the area through which the images are projected through the pupil and onto the retina, also referred to as the "eye box," is small, it is essential to have precise alignment between the RPD and the eye to ensure that the image enters the eye. Furthermore, as the gaze direction of a user can change during usage of an RPD, thus changing the location of the eye box, it is necessary to account for the change in gaze direction during usage of the RPD.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DESCRIPTION OF EMBODIMENTS

Figure 1:
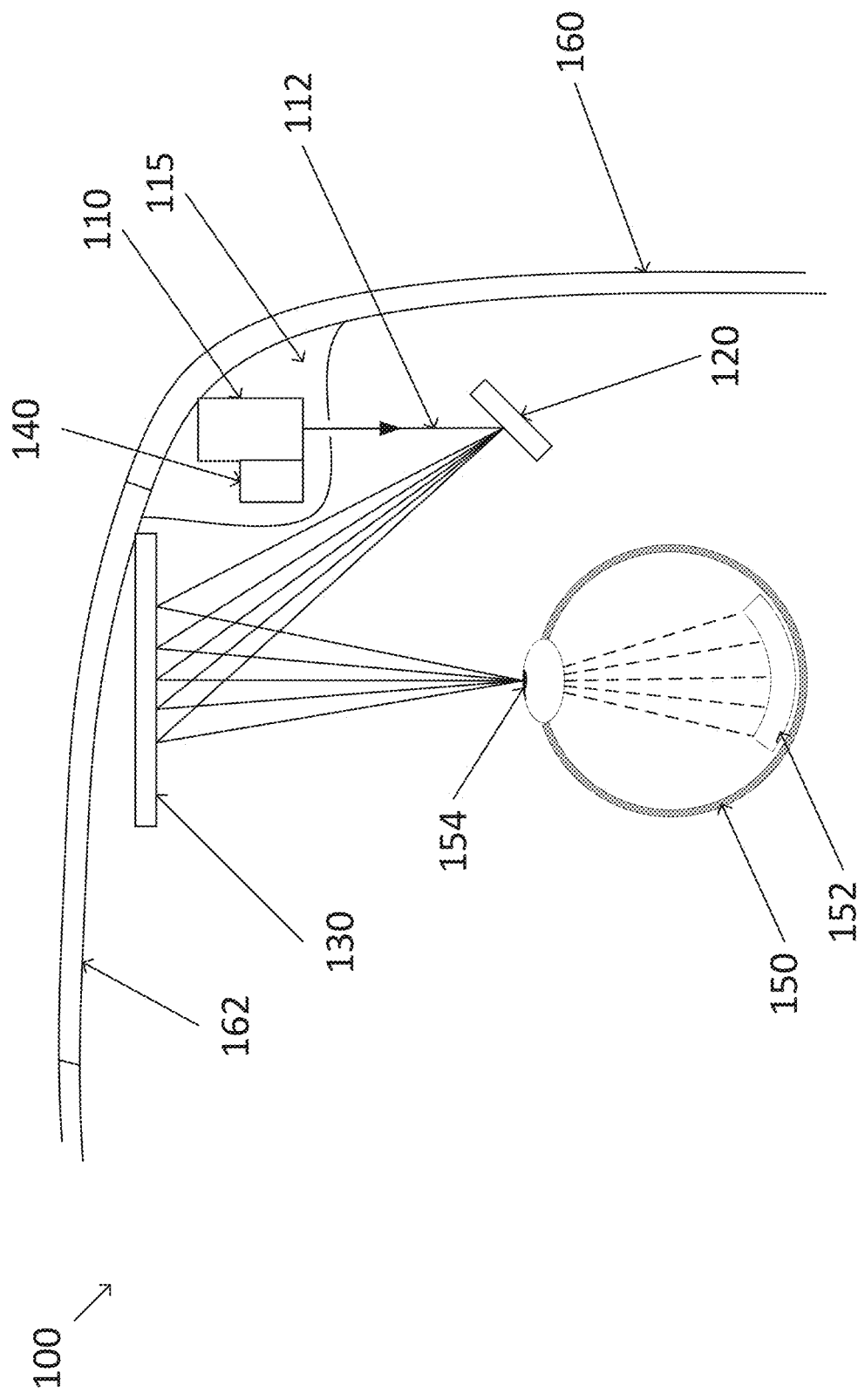
FIG. 1 illustrates an example retinal projection display system, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "performing," "determining," "detecting," "directing," "calculating," "correcting," "providing," "receiving," "analyzing," "confirming," "displaying," "presenting," "using," "completing," "instructing," "comparing," "executing," "tracking," "moving," "retrieving," "projecting," "calibrating," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example ultrasonic sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example retinal projection display system. Example operations of a retinal projection display system are then described.

Embodiments herein provide a retinal projection display system including a light source for projecting an image, a scanning mirror having a field of view larger than the image, and a reflective surface on which the image is projected, wherein the reflective surface is larger than the image. The scanning mirror projects the image onto a viewable region of the reflective surface such that the image is projected into a retina of a user. In some embodiments, the reflective surface is at least partially transparent. In some embodiments, the retinal projection display further includes an eyeglasses frame configured to be worn by the user and at least one lens mounted in the eyeglasses frame, where the reflective surface is positioned on at least a portion of the at least one lens.

In some embodiments, a pupillary distance alignment is determined during a calibration operation for the user, wherein the pupillary distance alignment identifies the viewable region of the reflective surface for a known gaze direction of the user. In some embodiments, the image is displayed at multiple locations of the reflective surface during the calibration operation, and the pupillary distance alignment is determined responsive to feedback from the user identifying the viewable region of the reflective surface.

In some embodiments, the retinal projection display system also includes a gaze tracker for tracking a gaze direction of the user, wherein the viewable region corresponds to the gaze direction. The scanning mirror is configured to dynamically move the image on the reflective surface according to the gaze direction of the user and the pupillary distance alignment of the user. In some embodiments, the scanning mirror is configured to dynamically move the image on the reflective surface according to the gaze direction of the user responsive to the gaze direction satisfying a movement threshold. In some embodiments, the wherein the scanning mirror is configured to dynamically move the image on the reflective surface according to the gaze direction of the user after a predetermined time delay. In some embodiments, the image is smaller than the viewable region such that scanning mirror is configured to dynamically move the image on the reflective surface according to the gaze direction of the user responsive to image moving outside of the viewable region.

In some embodiments, a scanning range of the scanning mirror is dynamically adjusted to correspond to a size of the image in the viewable region. In some embodiments, a scanning range of the scanning mirror corresponds to a size of a display area of the reflective surface, such that the light source is activated for displaying the image only when the scanning mirror is projecting the image in the viewable region.

Other embodiments described herein provide a method of retinal projection. An image from a light source is projected onto a reflective surface using a scanning mirror having a field of view larger than the image, where the reflective surface is larger than the image. In some embodiments, a scanning range of the scanning mirror is dynamically adjusted to correspond to a size of the image in the viewable region. In some embodiments, a scanning range of the scanning mirror corresponds to a size of display area of the reflective surface, such that the light source is activated for displaying the image only when the scanning mirror is projecting the image in the viewable region. In some embodiments, the reflective surface is at least partially transparent.

A viewable region of the reflective surface for a user is determined. In some embodiments, a pupillary distance alignment for the user is retrieved (e.g., from memory), wherein the pupillary distance alignment identifies the viewable region of the reflective surface for a known gaze direction of the user. In some embodiments, a gaze direction of the user is tracked, wherein the viewable region corresponds to the gaze direction.

The image is directed onto the viewable region of the reflective surface such that the image is projected into a retina of the user. In some embodiments, the image is dynamically moved on the reflective surface according to the gaze direction of the user and the pupillary distance alignment of the user using the scanning mirror.

In some embodiments, an amount of movement of the gaze direction is determined based on tracking the gaze direction of the user and, responsive to the amount of movement of the gaze direction satisfying a movement threshold, the image is moved on the reflective surface according to the gaze direction of the user and the pupillary distance alignment of the user. In some embodiments, the image is moved on the reflective surface according to the gaze direction of the user and the pupillary distance alignment of the user after a predetermined time delay. In some embodiments, responsive to determining that the image is outside of the viewable region, the image is moved on the reflective surface according to the gaze direction of the user and the pupillary distance alignment of the user.

Example Retinal Projection Display System

FIG. 1 illustrates an example retinal projection display system 100, according to some embodiments. Retinal projection display system 100 includes light source 110, scanning mirror 120, and reflective surface 130. In the illustrated embodiment, the components of retinal projection display system 100 are comprised within eyeglasses frame 160 that is configured to be worn by a user. Eyeglasses frame 160 includes at least one lens 162 mounted therein, where reflective surface 130 is positioned on at least a portion of lens 162 such that reflective surface 130 is within view of the user when gazing through lens 162. In some embodiments, reflective surface 130 is at least partially transparent, allowing the user to view through reflective surface 130 and lens 162. It should be appreciated that various components of retinal projection display system 100, such as light source 110 and scanning mirror 120, can be disposed on or within cavities eyeglasses frame 160 (e.g., within a cavity 115 of an arm/temple) and positioned such that light beam 112 is projected onto reflective surface 130.

During operation, light source 110 (e.g., a laser) projects an image onto a portion of reflective surface 130 by generating light beam 112 that is projected onto scanning mirror 120. In some embodiments, light source 110 is a single light source capable of projecting a complete image. In some embodiments, light source 110 include multiple light sources such as separate red, green, and blue (RGB) lasers that operate in coordination to project a complete image. It should be appreciated that many types of light sources can be used in accordance with the described embodiments.

Scanning mirror 120 is configured to move and direct light beam 112 such that it is scanned over reflective surface 130 to place each point of the image onto reflective surface 130, which directs light beam 112 through the user's pupil 154 of eye 150 and onto retina 152. It should be appreciated that a variety of scanning patterns can be used, as described below. It should be appreciated that the image scanning process is performed at a scanning rate fast enough (e.g., greater than 60 Hz) such that the user perceives the entire image, or as a continuous video of images. In some embodiments, scanning mirror 120 is a microelectromechanical (MEMS) device.

Scanning mirror 120 has a field of view (FOV) larger than the size of the intended viewable image and reflective surface 130 into which the viewable image is projected is also larger than the intended viewable image. Scanning mirror 120 projects the image onto a viewable region of reflective surface 130 such that the image is projected onto retina 152 of the user. The larger FOV allows for retinal projection display system 100 to properly project the image into pupil 154 and onto retina 152 independent of the movement and rotation of eye 150. In accordance with some embodiments, retinal projection display system 100 facilitate projecting the intended viewable image to align with pupil 154 by projecting over a viewable region of reflective surface 130 over a window of scanning mirror dynamic range.

A pupillary distance alignment is used to direct light beam 112 into pupil 154 of eye 150, where the pupillary distance alignment identifies the viewable region of reflective surface 130 for a known gaze direction of the user. In some embodiments, the pupillary distance alignment is determined during a calibration operation for the user. In some embodiments, the image is displayed at multiple locations of reflective surface 130 during the calibration operation, and the pupillary distance alignment is determined responsive to feedback from the user identifying the viewable region of the reflective surface. For example, the user feedback can be provided using a user interface of retinal projection display system 100, and can be received in many ways, e.g., voice commands, buttons located on eyeglasses frame 160, an application on a connected device such as a smart phone, etc.

In some embodiments, retinal projection display system 100 also includes gaze tracker 140 for tracking a gaze direction of the user. The viewable region of reflective surface 130 corresponds to the gaze direction of the user. Scanning mirror 120 is configured to dynamically move the image on reflective surface 130 according to the gaze direction of the user and the pupillary distance alignment of the user. Since the pupillary distance alignment for the user identifies the viewable region of reflective surface 130 for a known gaze direction of the user, scanning mirror 120 can move the image to correspond to the viewable region of reflective surface according to the gaze direction.

In some embodiments, to avoid jitter of the viewable image, scanning mirror 120 is configured to dynamically move the image on reflective surface 130 according to the gaze direction of the user responsive to the gaze direction satisfying a movement threshold. For instance, scanning mirror 120 only moves the image on reflective surface if sufficient movement of the gaze direction is detected. In some embodiments, jitter is accounted for by providing a rendered image smaller than the viewable region of reflective surface 130 such that scanning mirror 120 is configured to dynamically move the image on reflective surface 130 according to the gaze direction of the user responsive to image moving outside of the viewable region. This allows the image to be viewed over a larger range of positions on reflective surface 130 and minimizes jitter.

In some embodiments, to avoid image smearing, scanning mirror 120 is configured to dynamically move the image on reflective surface 130 according to the gaze direction of the user after a predetermined time delay after the change in gaze direction, allowing eye 150 to settle in the new gaze direction prior to moving the image.

In some embodiments, a scanning range of scanning mirror 120 is dynamically adjusted to correspond to a size of the image in the viewable region. In other embodiments, a scanning range of scanning mirror 120 corresponds to a size of a display area of reflective surface 130, such that light source 110 is activated for displaying the image only when scanning mirror 120 is projecting the image in the viewable region of reflective surface 130.

Figure 2:
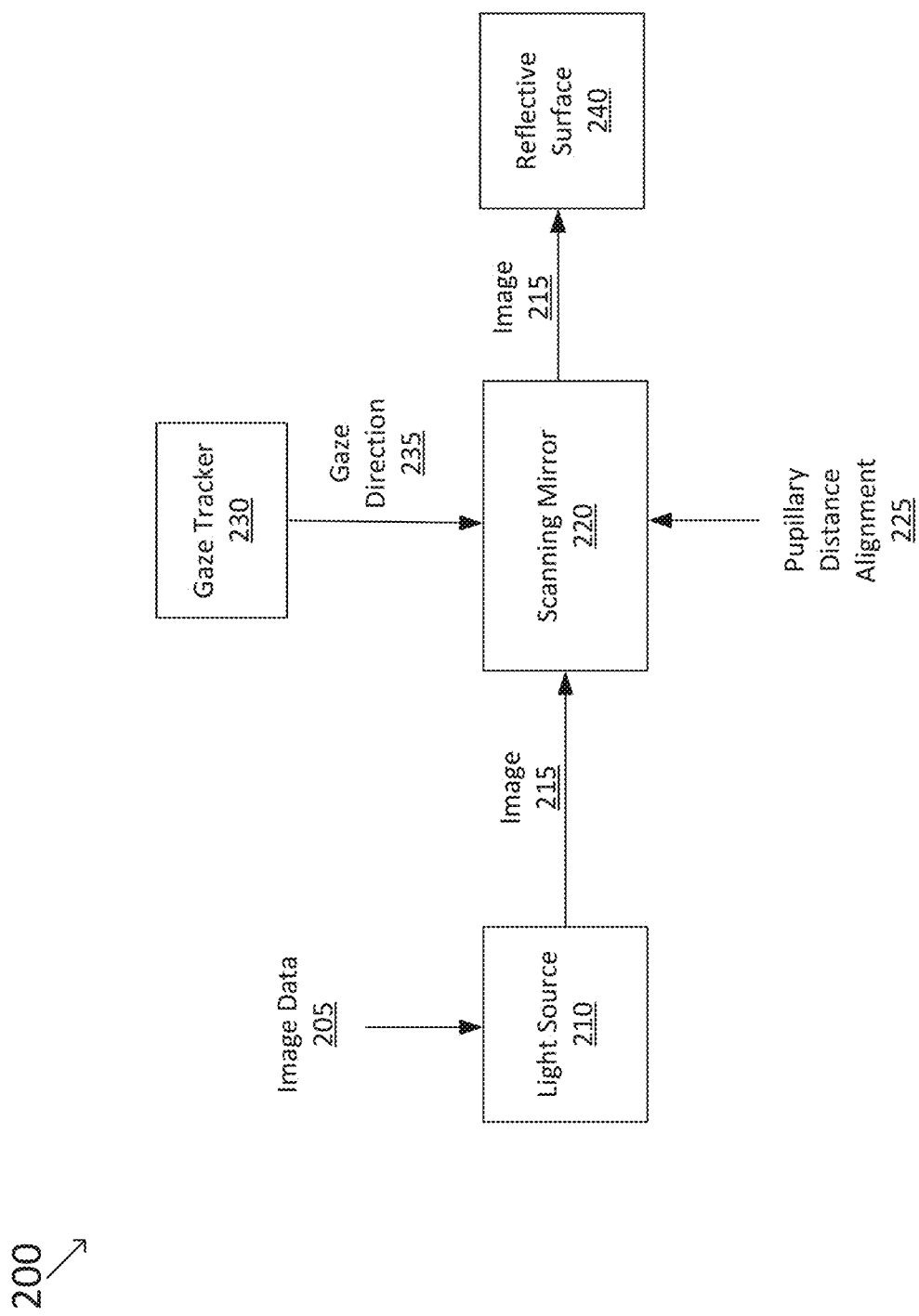
FIG. 2 illustrates a functional block diagram of an example retinal projection display system, according to some embodiments.

FIG. 2 illustrates a functional block diagram of an example retinal projection display system 200, according to some embodiments. Retinal projection display system 200 includes light source 210, scanning mirror 220, gaze tracker 230, and reflective surface. Light source 210 receives image data 205 from a data source for projection. It should be appreciated that image data 205 can include any type of data for displaying or rendering an image, including static image data, video data (e.g., a series of images), or other data for visualization by a user. In some embodiments, light source 210 is a single light source capable of projecting a complete image. In some embodiments, light source 210 include multiple light sources such as separate red, green, and blue (RGB) lasers that operate in coordination to project a complete image. It should be appreciated that many types of light sources can be used in accordance with the described embodiments.

Light source 210 (e.g., a laser) projects image 215 onto scanning mirror 220. It should be appreciated that image 215 is projected as a scan of pixels of image 215, where scanning mirror 220 dynamically moves to position each pixel at the proper location of reflective surface 240 for rendering. Scanning mirror 220 is configured to move and direct pixels of image 215 such that they are scanned over reflective surface 240 to place each point of the image onto reflective surface 240, which directs image 215 into the user's pupil and onto their retina. It should be appreciated that a variety of scanning patterns can be used, as described below. It should be appreciated that the image scanning process is performed at a scanning rate fast enough (e.g., greater than 60 Hz) such that the user perceives the entire image, or as a continuous video of images.

Scanning mirror 220 utilizes pupillary distance alignment 225 for the user and gaze direction 235 to control the position of pixels of image 215 such that they are directed onto the user's retina. The pupillary distance alignment identifies the viewable region of reflective surface 240 for a known gaze direction of the user.

Figure 3:
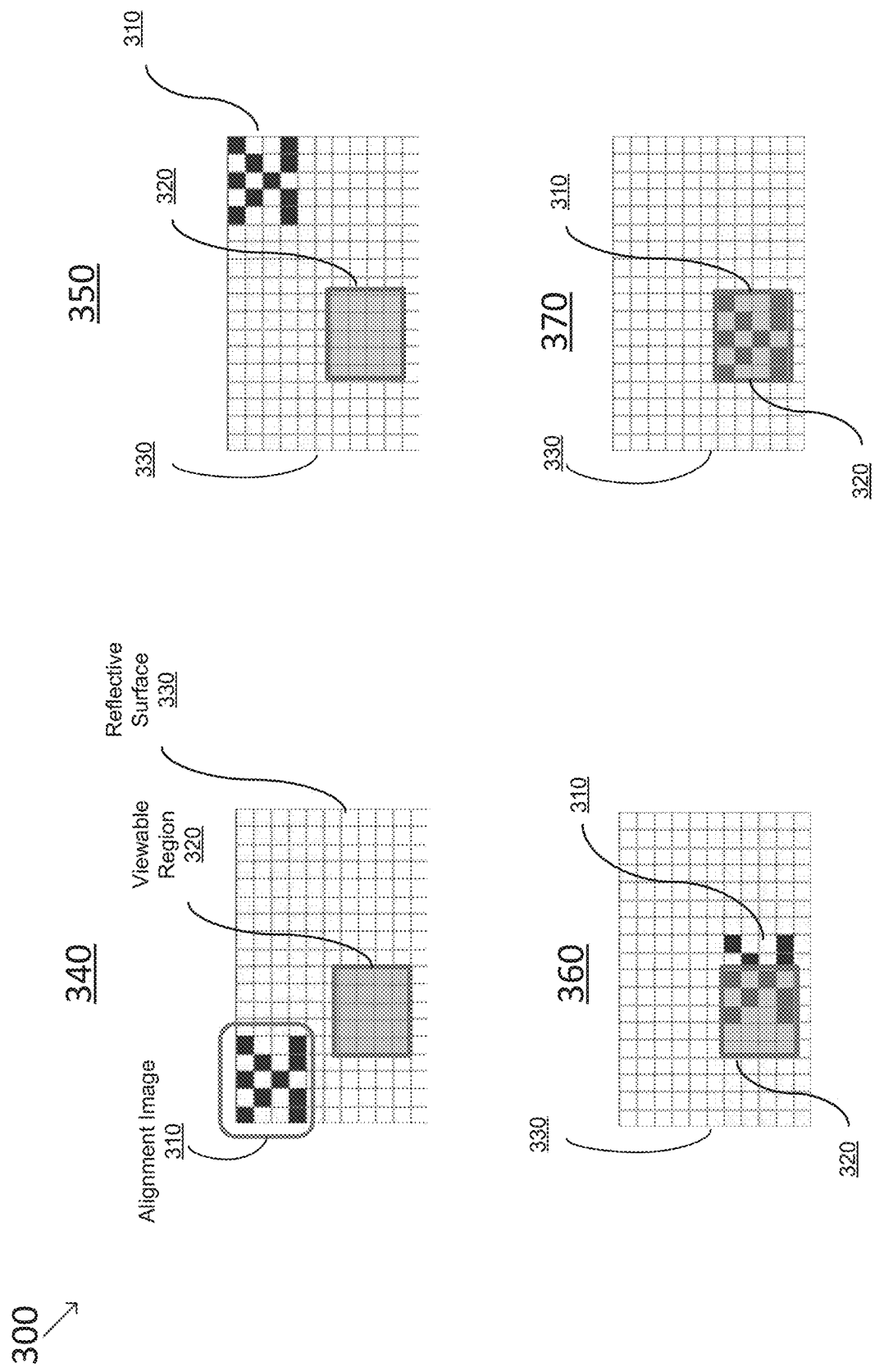
FIG. 3 illustrates an example pupillary distance alignment operation by projecting an alignment image onto a reflective surface, according to some embodiments.

FIG. 3 illustrates an example pupillary distance alignment operation 300 by projecting an alignment image onto a reflective surface, according to some embodiments. In some embodiments, pupillary distance alignment operation 300 is determined during a calibration operation for the user. In some embodiments, during pupillary distance alignment operation 300, alignment image 310 is displayed at multiple locations of reflective surface 330, and the pupillary distance alignment is determined responsive to feedback from the user identifying viewable region 320 of reflective surface 330. For example, the user feedback can be provided using a user interface of retinal projection display system 100, and can be received in many ways, e.g., voice commands, buttons located on eyeglasses frame 160, an application on a connected device such as a smart phone, etc.

During pupillary distance alignment operation 300, the user is instructed (e.g., via a user interface) to look in a particular direction (e.g., straight ahead). Alignment image 310 is rendered on reflective surface 330 and moved over the dynamic range of the scanning mirror to display alignment image at multiple locations on reflective surface 330. The user provides feedback (e.g., when prompted) as to whether alignment image 310 is fully visible, partially visible, or not visible. When alignment image 310 is within viewable region 320 and is visible to the user, e.g., partially or fully, the user provides feedback to indicate that alignment image 310 is visible. In some embodiments, alignment image 310 is adapted to help with alignment. For example, alignment image 310 may include information identifying portions of alignment image 310 such as characters, arrows, colors, or other indicators, that the user can use to indicate which part of alignment image 310 they see so that the retinal projection display system knows how to move alignment image 310 into viewable region 320.

As illustrated, alignment image 310 is projected onto reflective surface 330. In the illustrated example, at first time 340, alignment image 310 is not within the user's viewable region 320 of reflective surface 330 corresponding to the user's known gaze direction (e.g., straight forward). The user provides feedback that alignment image 310 is not visible to the user. At second time 350, alignment image 310 is moved to a different location of reflective surface 330 that is still not within viewable region 320. As illustrated, viewable region 320 is substantially static during pupillary distance alignment operation 300. The user provides feedback that alignment image 310 is not visible to the user.

At third time 360, alignment image 310 is moved to a different location of reflective surface 330 that is partially within viewable region 320. The user provides feedback that alignment image 310 is partially visible to the user. At fourth time 370, alignment image 310 is moved to a different location of reflective surface 330 that is fully within viewable region 320. The user provides feedback that alignment image 310 is fully visible to the user. The position of alignment image 310 at fourth time 370 is stored and used as the pupillary distance alignment for the user's known gaze direction (e.g., straight forward). The pupillary distance alignment is stored (e.g., within memory of the retinal projection display system).

With reference to FIG. 2, gaze tracker 230 is for tracking gaze direction 235 of the user. The viewable region of reflective surface 240 corresponds to the gaze direction of the user such that as gaze direction 235 moves, the viewable region of the user on reflective surface 240 moves as well. Scanning mirror 220 is configured to dynamically move image 215 on reflective surface 240 according to gaze direction 235 of the user and pupillary distance alignment 225 of the user. Since pupillary distance alignment 225 for the user identifies the viewable region of reflective surface 240 for a known gaze direction of the user, scanning mirror 220 can move image 215 to correspond to the viewable region of reflective surface 240 according to gaze direction 235.

Figure 4:
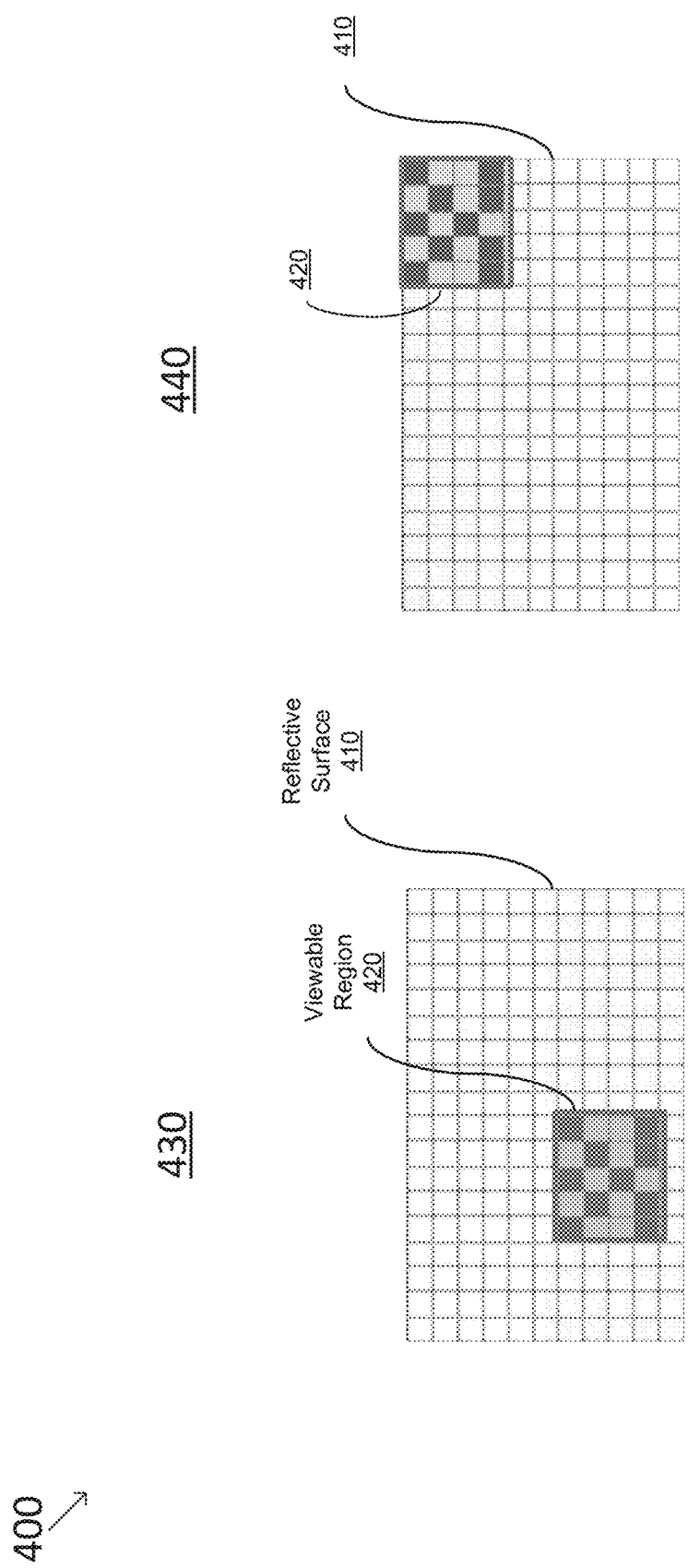
FIG. 4 illustrates an example gaze tracking operation used during projection of an image onto a reflective surface, according to some embodiments.

FIG. 4 illustrates an example gaze tracking operation 400 used during projection of an image onto a reflective surface, according to some embodiments. During gaze tracking operation 400, a gaze tracker (e.g., gaze tracker 140 of FIG. 1 or gaze tracker 230 of FIG. 2) is configured to track the gaze direction of the user. It should be appreciated that gaze tracking is understood by one of ordinary skill in the art, and that any type of gaze tracking technology or operation can be utilized or executed to perform gaze tracking operation 400. As the pupillary distance alignment identifying the viewable region for a known gaze direction of the user is known, the gaze direction can be used to move the viewable region of the user for any gaze direction.

As illustrated, an image is projected onto viewable region 420 of reflective surface 410. In the illustrated example, at first time 430, the image is within the user's viewable region 420 of reflective surface 410 corresponding to the user's gaze direction as identified by the gaze tracking. At second time 440, where the user's gaze direction has moved, viewable region 420 is moved, as is the image, corresponding to the user's gaze direction as identified by the gaze tracking at the later time.

In some embodiments, to avoid jitter of the viewable image, viewable region 420 is only moved if sufficient movement of the gaze direction is detected (e.g., a movement threshold is satisfied). In some embodiments, jitter is accounted for by providing a rendered image smaller than viewable region 420, such that viewable region 420 is moved responsive to the gaze direction of the user moving outside of viewable region 420. This allows the image to be viewed over a larger range of positions and minimizes jitter. In some embodiments, to avoid image smearing, viewable region 420 is moved according to the gaze direction of the user after a predetermined time delay after the change in gaze direction, allowing the user's eye to settle in the new gaze direction prior to moving the image.

With reference to FIG. 2, scanning mirror 220 projects image 215 (e.g., pixel by pixel) onto a viewable region of reflective surface 240 such that image 215 is projected into a retina of a user. In some embodiments, a scanning range of scanning mirror 220 is dynamically adjusted to correspond to a size of the image in the viewable region. In other embodiments, a scanning range of scanning mirror 220 corresponds to a size of a display area of reflective surface 240, such that light source 210 is activated for displaying the image only when scanning mirror 220 is projecting the image in the viewable region of reflective surface 240.

Figure 5A:
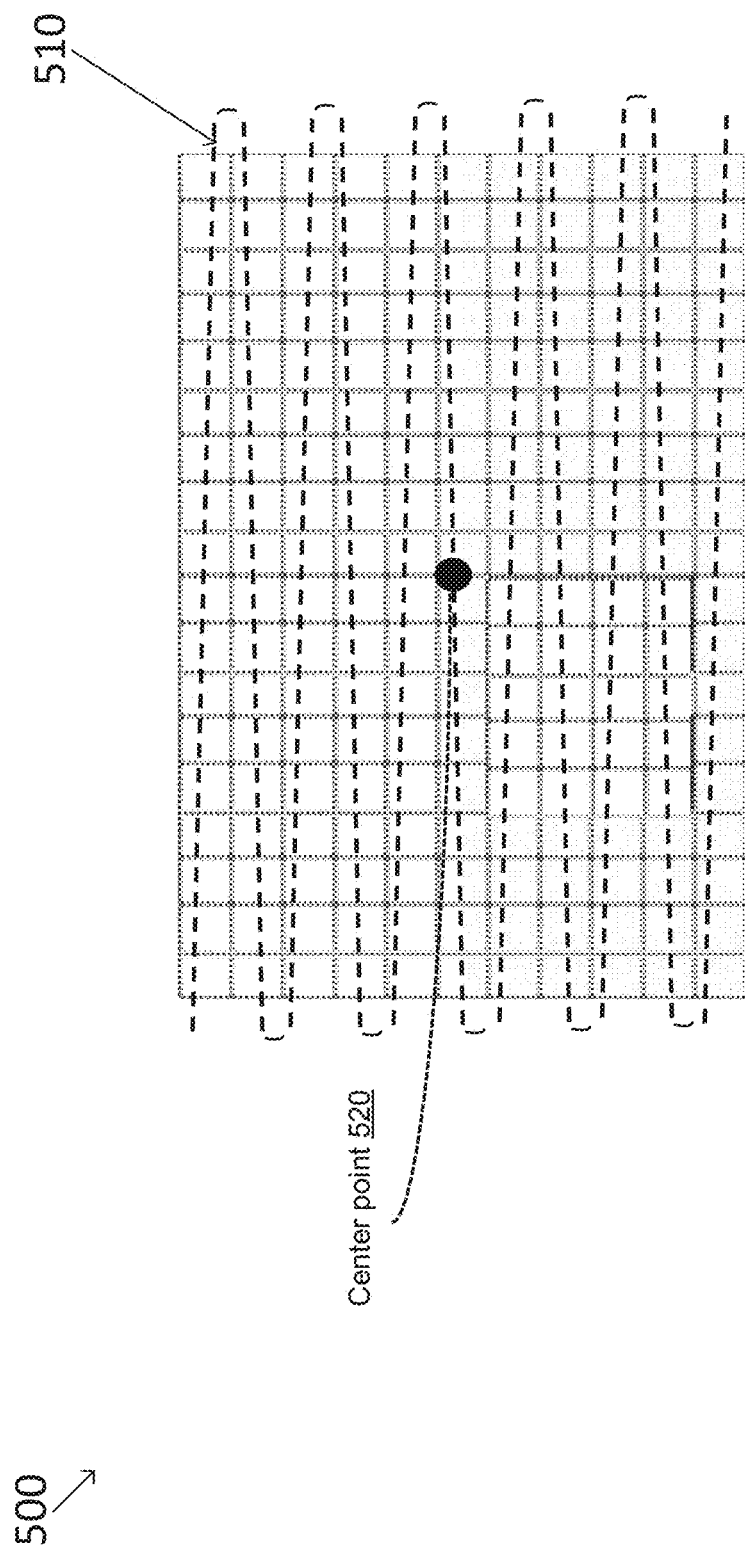
FIG. 5A illustrates an example scanning pattern over the full scanning range of the scanning mirror, according to an embodiment.
Figure 5B:
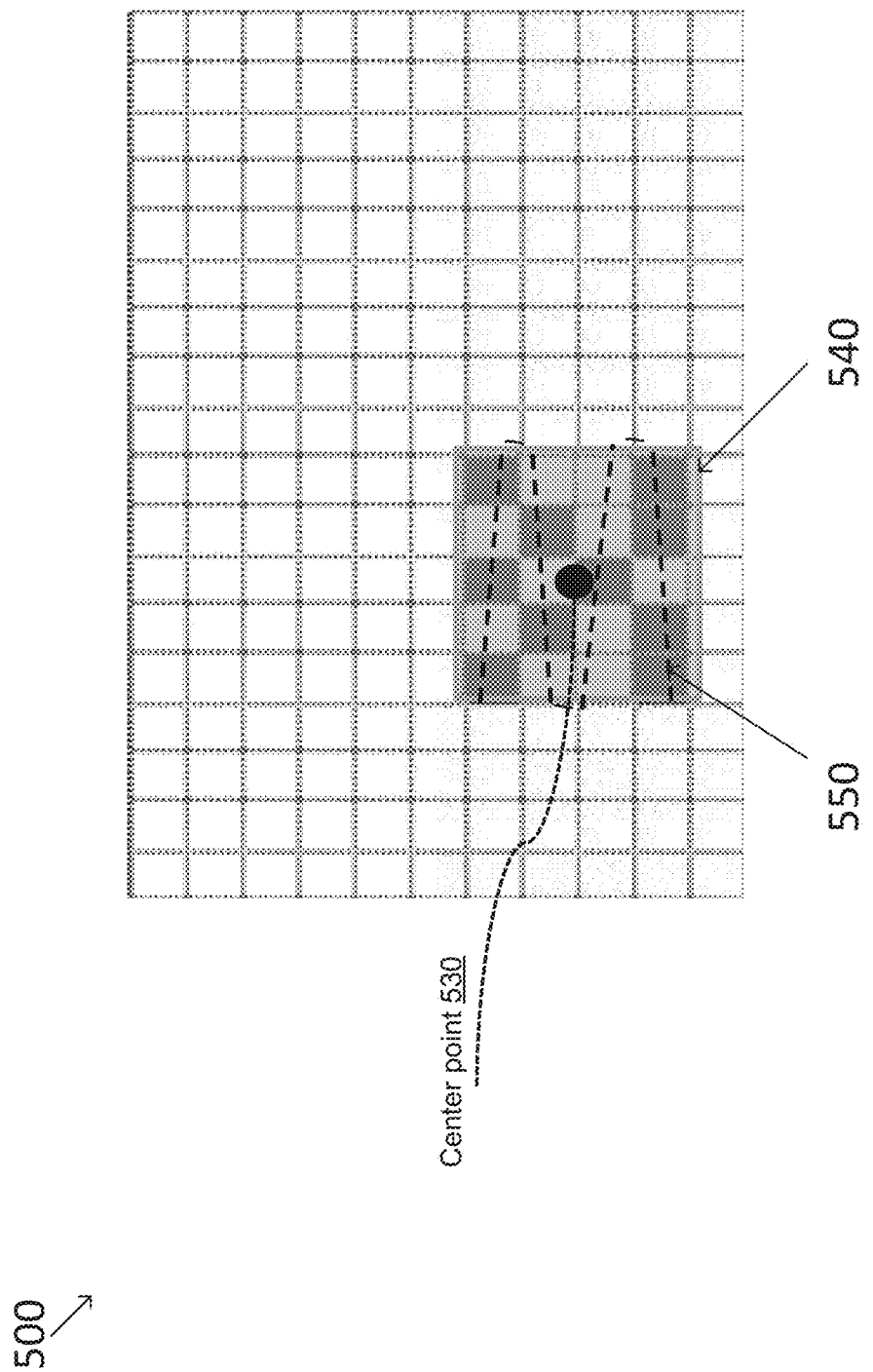
FIG. 5B illustrates an example scanning pattern where the scanning range of the scanning mirror is the size of the projected image.

FIGS. 5A and 5B illustrates an example image rendering operation 500 where the scanning range of the scanning mirror is the size of the projected image, according to an embodiment. FIG. 5A illustrates an example scanning pattern over the full scanning range 510 of the scanning mirror, where the scanning mirror is capable of rendering an image anywhere on the reflective surface, where the reflective surface is larger than a viewable region of the scanning surface. As illustrated, the scanning mirror is configured to move in the x and y directions, with center position 520 being the identified gaze direction of the user and the center position of the viewable region. Eye tracking is used to identify center position of the viewable region.

FIG. 5B illustrates an example scanning pattern where the scanning range of the scanning mirror is the size of the projected image. As illustrated in FIG. 5B, center position 530 is identified using gaze tracking, where center position 530 is moved relative to center position 520. The scanning mirror panning angles are controlled so that the x and y scanning range 550 covers the viewable region 540 as identified by center position B. In the illustrated embodiment, scanning range 550 of the scanning mirror is reduced to the cover viewable region 540 of the reflective surface rather than the entire reflective surface.

Figure 6:
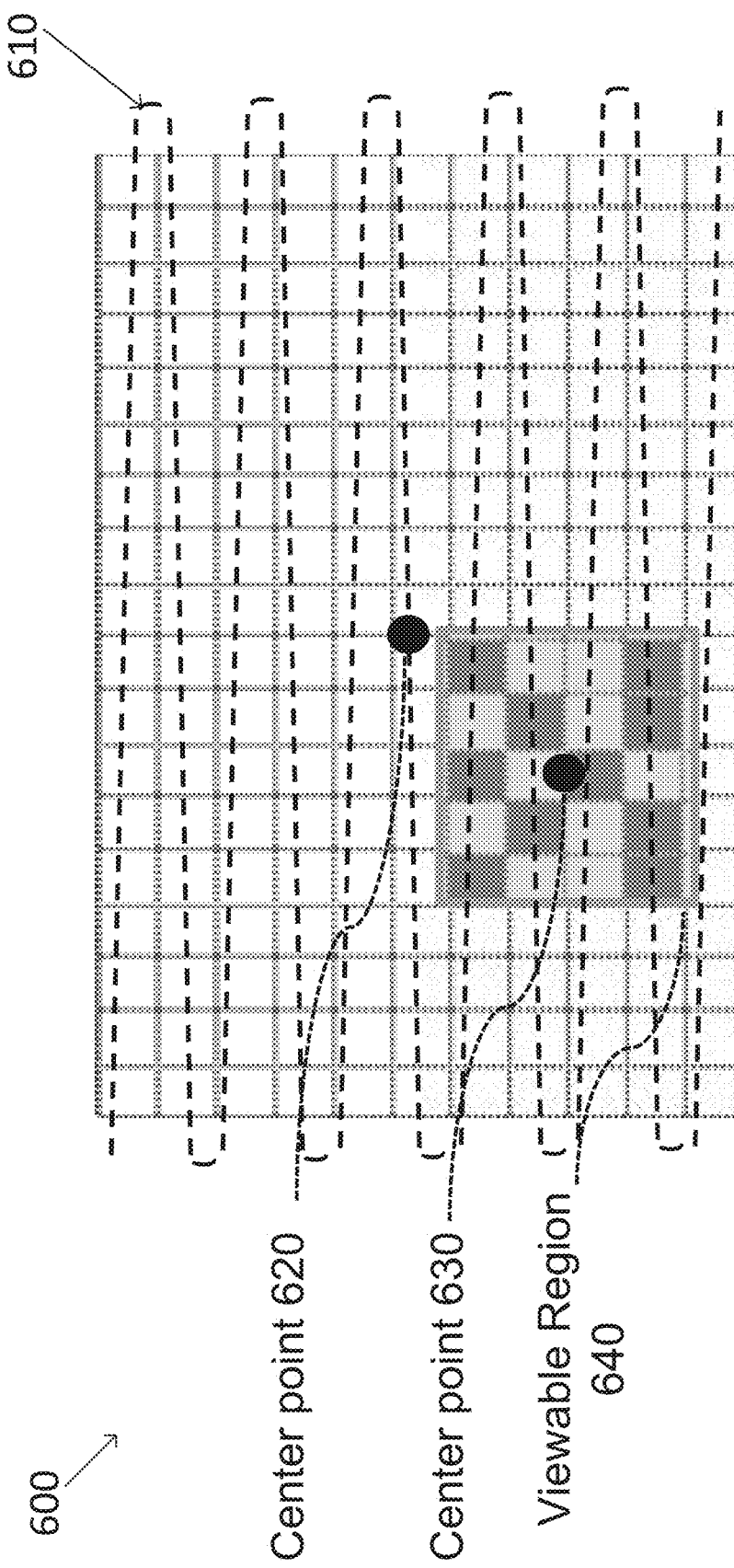
FIG. 6 illustrates an example image rendering operation where the scanning range of the scanning mirror is larger than the size of the projected image, according to an embodiment.

FIG. 6 illustrates an example image rendering operation 600 where the scanning range 610 of the scanning mirror is larger than the size of the projected image, according to an embodiment. As illustrated, the scanning mirror is configured to move in the x and y directions, with center position 620 being the identified gaze direction of the user and the center position of the viewable region. Eye tracking is used to identify center position of the viewable region.

As illustrated in FIG. 6, center position 630 is identified using gaze tracking, where center position 630 is moved relative to center position 620. Depending on gaze direction according to center position 630, the light source is only activated when the scanning mirror is within viewable region 640. The scanning mirror panning angles are controlled so that the x and y scanning range 610 covers the entire reflective surface area, but only activates the light source when the scanning mirror is within viewable region 640.

Figure 7:
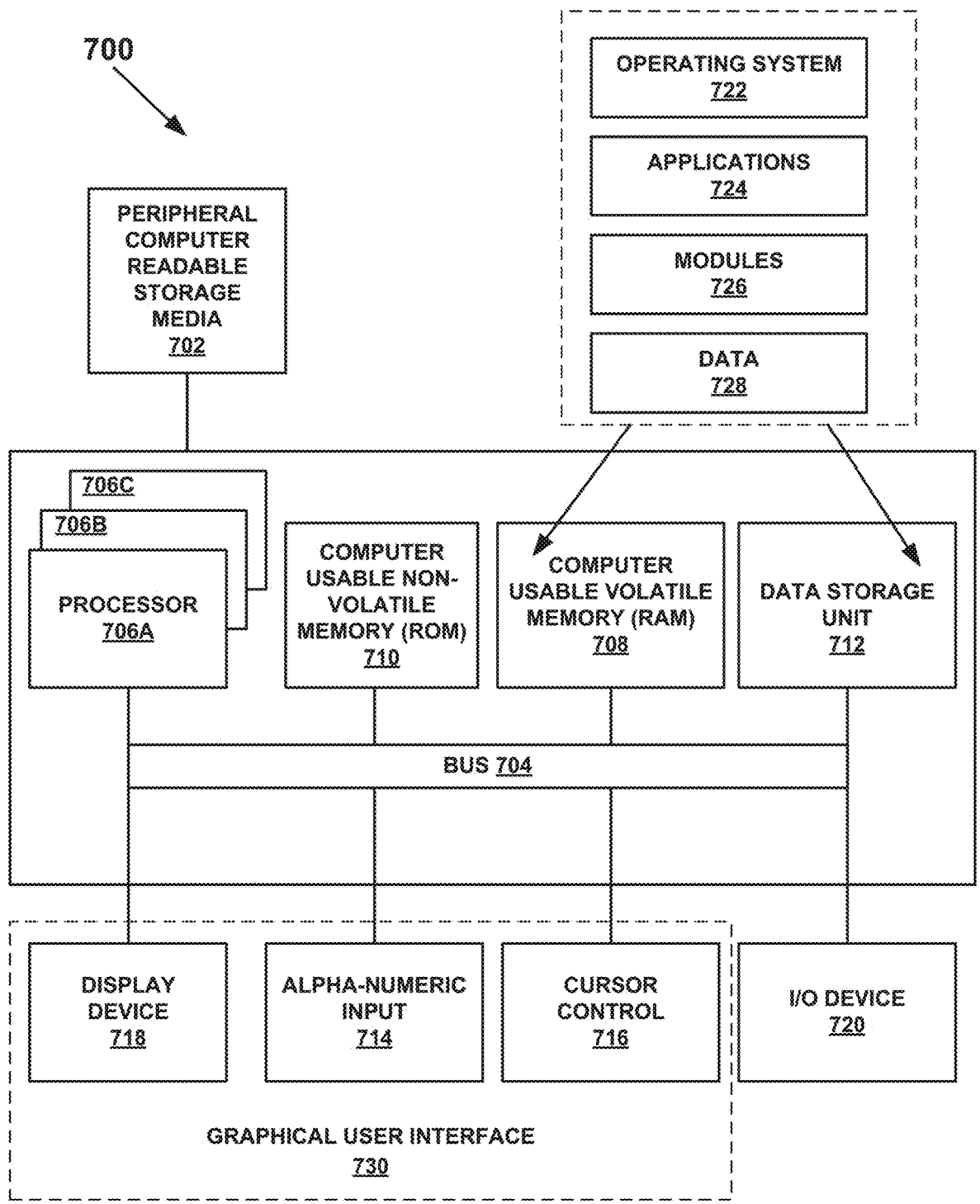
FIG. 7 is a block diagram of an example electronic device upon which embodiments described herein may be implemented.

FIG. 7 is a block diagram of an example electronic device 700 upon which embodiments of the present invention can be implemented. FIG. 7 illustrates one example of a type of electronic device 700 (e.g., a computer system) that can be used in accordance with or to implement various embodiments which are discussed herein. It should be appreciated that embodiments of the described retinal projection display system can be implemented using example electronic device 700.

It is appreciated that electronic device 700 of FIG. 7 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, electronic device 700 of FIG. 7 is well adapted to having peripheral tangible computer-readable storage media 702 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Electronic device 700 of FIG. 7 includes an address/data bus 704 for communicating information, and a processor 706A coupled with bus 704 for processing information and instructions. Bus 704 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent.

As depicted in FIG. 7, electronic device 700 is also well suited to a multi-processor environment in which a plurality of processors 706A, 706B, and 706C are present. Conversely, electronic device 700 is also well suited to having a single processor such as, for example, processor 706A. Processors 706A, 706B, and 706C may be any of various types of microprocessors. Electronic device 700 also includes data storage features such as a computer usable volatile memory 708, e.g., random access memory (RAM), coupled with bus 704 for storing information and instructions for processors 706A, 706B, and 706C. Electronic device 700 also includes computer usable non-volatile memory 710, e.g., read only memory (ROM), coupled with bus 704 for storing static information and instructions for processors 706A, 706B, and 706C. Also present in electronic device 700 is a data storage unit 712 (e.g., a magnetic or optical disc and disc drive) coupled with bus 704 for storing information and instructions. Electronic device 700 also includes an alphanumeric input device 714 including alphanumeric and function keys coupled with bus 704 for communicating information and command selections to processor 706A or processors 706A, 706B, and 706C. Electronic device 700 also includes an cursor control device 716 coupled with bus 704 for communicating user input information and command selections to processor 706A or processors 706A, 706B, and 706C. In one embodiment, electronic device 700 also includes a display device 718 coupled with bus 704 for displaying information. Depending on the architecture, different bus configurations may be employed as desired. For example, additional buses may be used to couple the various components of electronic device 700, such as by using a dedicated bus between processor 706A and memory computer usable volatile memory 708 or computer usable non-volatile memory 710.

Referring still to FIG. 7, display device 718 of FIG. 7 may include a light source (e.g., light source 110 of FIG. 1) for projecting image data onto a reflective surface. In other embodiments, display device 718 may be a liquid crystal device (LCD), light emitting diode display (LED) device, plasma display device, a touch screen device, or other display device suitable for creating graphic images and alphanumeric characters recognizable to a user. Cursor control device 716 allows the computer user to dynamically signal the movement of a visible symbol (cursor) on a display screen of display device 718 and indicate user selections of selectable items displayed on display device 718. Many implementations of cursor control device 716 are known in the art including a trackball, mouse, touch pad, touch screen, joystick or special keys on alphanumeric input device 714 capable of signaling movement of a given direction or manner of displacement. Alternatively, it will be appreciated that a cursor can be directed and/or activated via input from alphanumeric input device 714 using special keys and key sequence commands. Electronic device 700 is also well suited to having a cursor directed by other means such as, for example, voice commands. In various embodiments, alphanumeric input device 714, cursor control device 716, and display device 718, or any combination thereof (e.g., user interface selection devices), may collectively operate to provide a graphical user interface (GUI) 730 under the direction of a processor (e.g., processor 706A or processors 706A, 706B, and 706C). GUI 730 allows user to interact with electronic device 700 through graphical representations presented on display device 718 by interacting with alphanumeric input device 714 and/or cursor control device 716.

Electronic device 700 also includes an I/O device 720 for coupling electronic device 700 with external entities. For example, in one embodiment, I/O device 720 is a modem for enabling wired or wireless communications between electronic device 700 and an external network such as, but not limited to, the Internet. In one embodiment, I/O device 720 includes a transmitter. Electronic device 700 may communicate with a network by transmitting data via I/O device 720.

Referring still to FIG. 7, various other components are depicted for electronic device 700. Specifically, when present, an operating system 722, applications 724, modules 726, and data 728 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable storage media within data storage unit 712, peripheral computer-readable storage media 702, and/or other tangible computer-readable storage media.

Example Operations for Operating a Retinal Projection Display System

Figure 8:
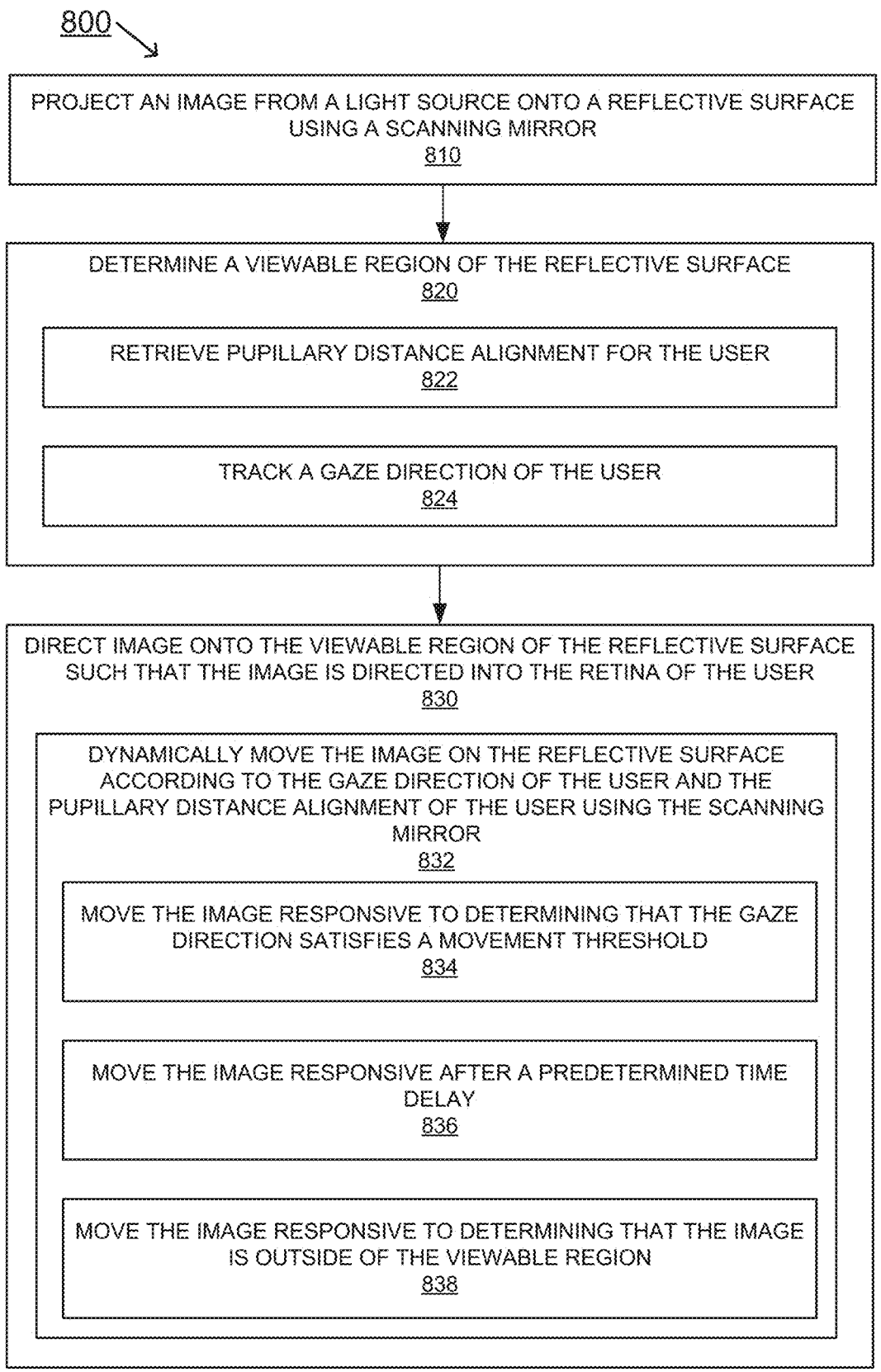
FIG. 8 illustrates an example process of retinal projection, according to some embodiments.
Figure 9:
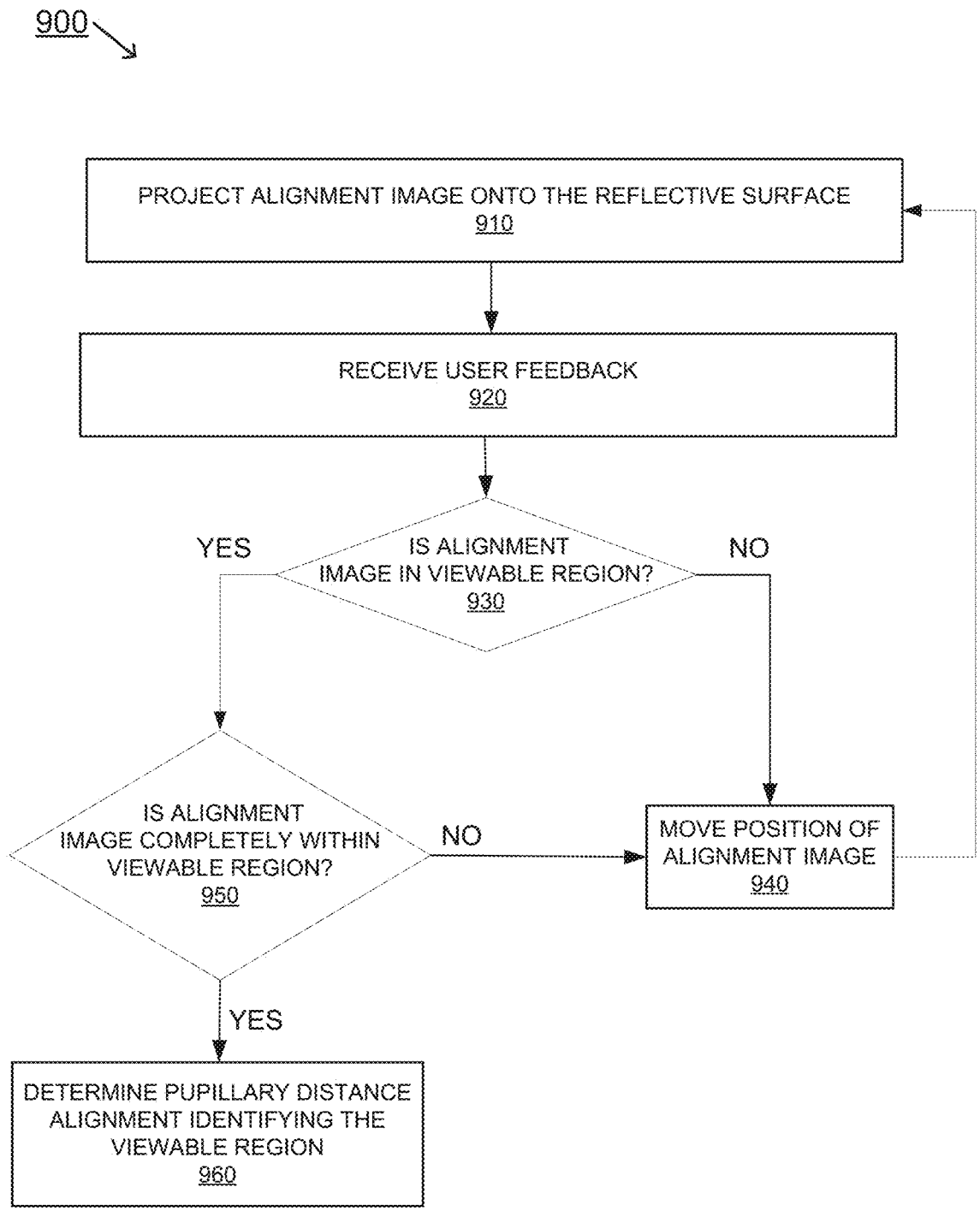
FIG. 9 illustrates an example process for determining a pupillary distance alignment, according to some embodiments.

FIG. 8 illustrates an example process of retinal projection and FIG. 9 illustrates an example process for determining a pupillary distance alignment, according to some embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

With reference to FIG. 8, flow diagram 800 illustrates an example process of retinal projection, according to some embodiments. At procedure 810 of flow diagram 800, an image from a light source is projected onto a reflective surface using a scanning mirror having a field of view larger than the image, where the reflective surface is larger than the image. In some embodiments, a scanning range of the scanning mirror is dynamically adjusted to correspond to a size of the image in the viewable region. In some embodiments, a scanning range of the scanning mirror corresponds to a size of display area of the reflective surface, such that the light source is activated for displaying the image only when the scanning mirror is projecting the image in the viewable region. In some embodiments, the reflective surface is at least partially transparent.

At procedure 820, a viewable region of the reflective surface for a user is determined. In some embodiments, as shown at procedure 822, a pupillary distance alignment for the user is retrieved (e.g., from memory), wherein the pupillary distance alignment identifies the viewable region of the reflective surface for a known gaze direction of the user. In some embodiments, as shown at procedure 824, a gaze direction of the user is tracked, wherein the viewable region corresponds to the gaze direction.

At procedure 830, the image is directed onto the viewable region of the reflective surface such that the image is projected into a retina of the user. In some embodiments, as shown at procedure 832, the image is dynamically moved on the reflective surface according to the gaze direction of the user and the pupillary distance alignment of the user using the scanning mirror.

In some embodiments, as shown at procedure 834, an amount of movement of the gaze direction is determined based on tracking the gaze direction of the user and, responsive to the amount of movement of the gaze direction satisfying a movement threshold, the image is moved on the reflective surface according to the gaze direction of the user and the pupillary distance alignment of the user. In some embodiments, as shown at procedure 836, the image is moved on the reflective surface according to the gaze direction of the user and the pupillary distance alignment of the user after a predetermined time delay. In some embodiments, as shown at procedure 838, responsive to determining that the image is outside of the viewable region, the image is moved on the reflective surface according to the gaze direction of the user and the pupillary distance alignment of the user.

FIG. 9 illustrates an example flow diagram 900 for determining a pupillary distance alignment, e.g., during a calibration operation, according to some embodiments. At procedure 910 of flow diagram 900, an alignment image is projected onto the reflective surface. At procedure 920, user feedback is received regarding the viewability of the alignment image while the user is gazing in a known gaze direction. At procedure 930, it is determined whether the alignment image is in the viewable region according to the user feedback. If the alignment image is not in the viewable region, flow diagram 900 proceeds to procedure 940. At procedure 940, the position of the alignment image is moved on the reflective surface to another position. If the alignment image is within in the viewable region, flow diagram 900 proceeds to procedure 950.

At procedure 950, it is determined whether the alignment image is completely within the viewable region according to the user feedback. If the alignment image is not completely within the viewable region, flow diagram 900 proceeds to procedure 940. At procedure 940, the position of the alignment image is moved on the reflective surface to another position. If the alignment image is completely within the viewable region, flow diagram 900 proceeds to procedure 960. At procedure 960, the pupillary distance alignment identifying the viewable region of the reflective surface for the known gaze direction of the user is determined. In some embodiments, the pupillary distance alignment is stored (e.g., in memory) for retrieval during retinal projection display operation.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A retinal projection display system comprising:
a light source for projecting an image;
a scanning mirror having a field of view larger than the image; and
a reflective surface on which the image is projected, wherein the reflective surface is larger than the image;
wherein the scanning mirror projects the image onto a viewable region of the reflective surface such that the image is projected into a retina of a user, wherein a pupillary distance alignment is determined during a calibration operation for the user, wherein the pupillary distance alignment identifies the viewable region of the reflective surface for a known gaze direction of the user, wherein the image is displayed at multiple locations of the reflective surface during the calibration operation, and the pupillary distance alignment is determined responsive to feedback from the user identifying the viewable region of the reflective surface.

2. The retinal projection display system of claim 1, further comprising:
a gaze tracker for tracking a gaze direction of the user, wherein the viewable region corresponds to the gaze direction;
wherein the scanning mirror is configured to dynamically move the image on the reflective surface according to the gaze direction of the user and the pupillary distance alignment of the user.

3. The retinal projection display system of claim 2, wherein the scanning mirror is configured to dynamically move the image on the reflective surface according to the gaze direction of the user responsive to the gaze direction satisfying a movement threshold.

4. The retinal projection display system of claim 2, wherein the scanning mirror is configured to dynamically move the image on the reflective surface according to the gaze direction of the user after a predetermined time delay.

5. The retinal projection display system of claim 2, wherein the image is smaller than the viewable region such that scanning mirror is configured to dynamically move the image on the reflective surface according to the gaze direction of the user responsive to image moving outside of the viewable region.

6. The retinal projection display system of claim 1, wherein the reflective surface is at least partially transparent.

7. The retinal projection display system of claim 1, further comprising:
an eyeglasses frame configured to be worn by the user; and
at least one lens mounted in the eyeglasses frame, where the reflective surface is positioned on at least a portion of the at least one lens.

8. A retinal projection display system comprising:
a light source for projecting an image;
a scanning mirror having a field of view larger than the image; and
a reflective surface on which the image is projected, wherein the reflective surface is larger than the image;
wherein the scanning mirror projects the image onto a viewable region of the reflective surface such that the image is projected into a retina of a user, and wherein a scanning range of the scanning mirror is dynamically adjusted to correspond to a size of the image in the viewable region.

9. A retinal projection display system comprising:
a light source for projecting an image;
a scanning mirror having a field of view larger than the image; and
a reflective surface on which the image is projected, wherein the reflective surface is larger than the image;
wherein the scanning mirror projects the image onto a viewable region of the reflective surface such that the image is projected into a retina of a user, and wherein a scanning range of the scanning mirror corresponds to a size of a display area of the reflective surface, such that the light source is activated for displaying the image only when the scanning mirror is projecting the image in the viewable region.

10. A method of retinal projection, the method comprising:
projecting an image from a light source onto a reflective surface using a scanning mirror having a field of view larger than the image, wherein the reflective surface is larger than the image;
determining a viewable region of the reflective surface for a user, wherein the determining the viewable region of the reflective surface of the user comprises:
  retrieving a pupillary distance alignment for the user, wherein the pupillary distance alignment identifies the viewable region of the reflective surface for a known gaze direction of the user, wherein the pupillary distance alignment is determined during a calibration operation for the user, the method further comprising:
    during the calibration operation:
      projecting an alignment image onto the reflective surface;
      moving the alignment image across a display area of the reflective surface; and
      responsive to feedback from the user, determining the pupillary distance alignment identifying the viewable region of the reflective surface for the known gaze direction of the user; and
directing the image onto the viewable region of the reflective surface such that the image is projected into a retina of the user.

11. The method of claim 10, wherein the determining the viewable region of the reflective surface of the user further comprises:
tracking a gaze direction of the user, wherein the viewable region corresponds to the gaze direction.

12. The method of claim 11, wherein the directing the image onto the viewable region of the reflective surface such that the image is projected into a retina of the user comprises:
dynamically moving the image on the reflective surface according to the gaze direction of the user and the pupillary distance alignment of the user using the scanning mirror.

13. The method of claim 12, wherein the dynamically moving the image on the reflective surface according to the gaze direction of the user and the pupillary distance alignment of the user using the scanning mirror comprises:
determining an amount of movement of the gaze direction based on the tracking the gaze direction of the user; and
responsive to the amount of movement of the gaze direction satisfying a movement threshold, moving the image on the reflective surface according to the gaze direction of the user and the pupillary distance alignment of the user.

14. The method of claim 12, wherein the dynamically moving the image on the reflective surface according to the gaze direction of the user and the pupillary distance alignment of the user using the scanning mirror comprises:
moving the image on the reflective surface according to the gaze direction of the user and the pupillary distance alignment of the user after a predetermined time delay.

15. The method of claim 12, wherein the image is smaller than the viewable region and wherein the dynamically moving the image on the reflective surface according to the gaze direction of the user and the pupillary distance alignment of the user using the scanning mirror comprises:
determining whether the image is outside of the viewable region; and
responsive to determining that the image is outside of the viewable region, moving the image on the reflective surface according to the gaze direction of the user and the pupillary distance alignment of the user.

16. The method of claim 10, wherein the reflective surface is at least partially transparent.

17. A method of retinal projection, the method comprising:
projecting an image from a light source onto a reflective surface using a scanning mirror having a field of view larger than the image, wherein the reflective surface is larger than the image;
determining a viewable region of the reflective surface for a user;
directing the image onto the viewable region of the reflective surface such that the image is projected into a retina of the user; and
wherein a scanning range of the scanning mirror is dynamically adjusted to correspond to a size of the image in the viewable region.

18. A method of retinal projection, the method comprising:
projecting an image from a light source onto a reflective surface using a scanning mirror having a field of view larger than the image, wherein the reflective surface is larger than the image;
determining a viewable region of the reflective surface for a user;
directing the image onto the viewable region of the reflective surface such that the image is projected into a retina of the user; and
wherein a scanning range of the scanning mirror corresponds to a size of display area of the reflective surface, such that the light source is activated for displaying the image only when the scanning mirror is projecting the image in the viewable region.

* * * * *